United States Patent [19]

De Cat et al.

[11] 3,759,935

[45] Sept. 18, 1973

[54] METHOD FOR THE PREPARATION OF 2-ALKYL SUBSTITUTED THIAZOLES AND SELENAZOLES

[75] Inventors: Arthur Henri De Cat, Mortsel; Leo Hypoliet Manssens, Schilde, both of Belgium

[73] Assignee: Gevaert-AGFA N.V., Mortsel, Belgium

[22] Filed: Oct. 27, 1970

[21] Appl. No.: 84,490

[30] Foreign Application Priority Data
Nov. 3, 1969    Great Britain................... 53,824/69

[52] U.S. Cl................. 260/298, 260/304, 260/607, 260/608
[51] Int. Cl. ...................... C07d 97/02, C07d 91/44
[58] Field of Search............................ 260/304, 298

[56] References Cited

UNITED STATES PATENTS

| | | | |
|---|---|---|---|
| 2,980,671 | 4/1961 | Nys et al............................ | 260/298 |
| 3,177,210 | 4/1965 | Rosenoff............................ | 260/304 |

*Primary Examiner*—Richard J. Gallagher
*Attorney*—Brufsky, Staas, Breiner and Halsey

[57] ABSTRACT

A method of preparing 2-alkylthiazoles or 2-alkylselenazoles is described wherein an aromatic disulphide or diselenide having amino groups or nitro groups in the 2-positions relative to the disulphide or diselenide group is catalytically hydrogenated using a rhenium sulphide as catalyst in the presence of an aliphatic carboxylic anhydride. The method is a one-step synthesis and high yields of 2-alkyl thiazoles or selenazoles are obtained having a high degree of purity.

9 Claims, No Drawings

METHOD FOR THE PREPARATION OF 2-ALKYL SUBSTITUTED THIAZOLES AND SELENAZOLES

The present invention relates to a new method for the preparation of a 2-alkyl substituted thiazoles or selenazoles with fused-on aromatic group.

As is known 2-alkyl-benzothiazoles, 2-alkyl-naphthothiazoles, 2-alkyl-benzoselenazoles and 2-alkylnaphthoselenazoles are important heterocyclic bases for use in the preparation of methine dyes (see e.g., F.M. Hamer "The Cyanine Dyes and related compounds" Interscience Publishers 1964, New-York/London, and P.Glafkides, Photographic Chemistry, Vol. II, Chapter XXXVI, Fountain press, London), which are used amongst others as spectrally sensitizing agents for photosensitive systems such as photographic silver halide material and electrophotographic material.

It has now been that 2-alkyl substituted thiazoles or selenazoles having a fused-on 6-carbon mononuclear or 10-carbon dinuclear aromatic ring can be prepared by catalytic hydrogenation under pressure of an aromatic disulphide or diselenide comprising in the 2-positions relative to the disulphide or diselenide group, amino groups or nitro groups, said hydrogenation taking place in the presence of an aliphatic carboxylic anhydride using as catalyst a rhenium sulphide, more particularly rhenium(VII)sulphide. The said aliphatic carboxylic anhydride may serve also as the reaction medium.

The general one step synthesis of 2-alkyl substituted thiazoles or selenazoles having a fused-on 6-carbon mononulcear or 10-carbon dinuclear aromatic ring according to the present invention is time-saving and gives high yields with a high degree of purity. Moreover, the method of the invention can be carried out very easily, even on an industrial scale without giving rise to technological difficulties.

The rhenium sulphide used according to the present invention is not poisoned by the sulphur-containing starting products used in the method of the invention and cause no fission of the carbon-sulphur bond, while being resistant to carboxylic anhydrides.

The method of the invention can be represented by the following reaction scheme:

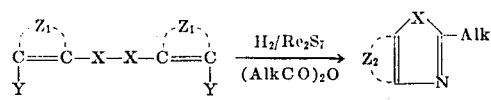

wherein:
Alk stands for $C_1$-$C_5$ alkyl for example methyl and ethyl,
X stands for sulphur or selenium,
Y stands for nitro or amino,
$Z_1$ stands for the atoms necessary to complete a benzene or naphthalene ring including a substituted benzene or naphthalene ring for instance substituted by alkyl including substituted alkyl for example methyl, ethyl, trifluoromethyl, acyloxymethyl, and hydroxymethyl, alkenyl for example allyl, aryl including substituted aryl, halogen such as chlorine, alkyloxy, alkylthio, alkylsulphonyl, haloalkyloxy, haloalkylthio, haloalkylsulphonyl, carboxy, sulpho, amino, (di)alkylamino, acylamino, nitro, alkoxycarbonyl, etc., and
$Z_2$ stands for the atoms necessary to complete a benzene or naphthalene ring optionally carrying substituents, which are either identical to the substituents present in $Z_1$ or are derived forms thereof converted under the reaction conditions of the invention such as amino where $Z_1$ carries nitro, acetyloxymethyl where $Z_1$ carries hydroxymethyl, propyl where $Z_1$ carries allyl, etc.

Under the reaction conditions of the invention it would be possible to prepare the benzothiozoles starting from 2-nitrothiophenols instead of using bis(2-nitrophenyl)disulphides; however, 2-nitrothiophenols as compared with bis(2-nitrophenyl)-disulphides disulphides are difficult to prepare.

The method of the present invention comprises more especially the steps of admixing an aromatic disulphide or diselenide carrying in the 2-positions relative to the disulphide or diselenide group nitro groups or amino groups with an aliphatic carboxylic anhydride and a catalytic amount of a rhenium sulphide, charging the reaction vessel with a sufficient hydrogen pressure, heating the reaction mixture to a temperature at which hydrogen is readily absorbed until absorption of hydrogen ceases, cooling the reaction mixture to a temperature below the boiling temperature of the aliphatic carboxylic acid formed, filtering off the rhenium sulphide catalyst and isolating the 2-alkyl heterocyclic base formed from the filtrate by any suitable means e.g., by concentrating the filtrate by evaporation if necessary under rpduced pressure and filtering off the precipitate formed or distilling the residue.

The rhenium sulphide catalyst is generally used in amounts comprised between 0.25 g and 10 g, preferably from 1 g to 5 g per mole of disulphide or diselenide compound.

The amount of aliphatic carboxylic anhydride used may vary between wide limits. The most effective amount can easily be determined by some simple tests. The required minimum theoretical amount depends on whether there is stated from a 2,2′-dinitro aromatic disulphide or diselenide or from a 2,2′-diaminoaromatic disulphide or diselenide and from the optional presence of further nitro and amino groups. The minimum amount of aliphatic carboxylic anhydride is 3 moles of anhydride per nitro group present and 2 moles of anhydride per amino group present. Solubility considerations may necessitate the use of larger amounts and also supplemental amounts may be required to convert other groups present in the starting material.

Indeed, the 2,2′-dinitro (or 2,2′-diamino)phenyl (or naphthyl) disulphide or diselenide might comprise in addition to the 2,2′-dinitro (or diamino) groups, groups known to those skilled in the art of preparative organic chemistry to undergo alteration under the reaction conditions of the method of the invention either by reaction with the carboxylic anhydride used or by being itself hydrogenated so that the resulting thiazole or selenazole compounds comprise in the fused-on aromatic ring substituents of a nature different from those of the starting materials. For instance when the 2,2′-dinitro (or 2,2′-diamino)phenyl (or naphthyl) disulphide or diselenide comprises further nitro or amino groups, the heterocyclic base formed will carry an acyl amino group, by reaction of the amino or reduced nitro group with the aliphatic acarboxylic anhydride; as known by those skilled in the art of preparative organic chemistry the acyl amino group can be converted into amino by boiling with hydrochloric acid.

In the same way, substituents in the starting products carrying hydroxyl groups such as hydroxymethyl, will also react with the carboxylic anhydride to form ester groups; as is illustrated hereinafter it is possible to hydrolyse the ester group formed by treating the reaction mixture afterwards with hydrochloric acid so that the hydroxyl group is formed again.

The exact working conditions of the method of the invention are of course dependent on the nature of the starting material used and the optimum combination of temperature, pressure, amount of catalyst used and the reaction time. A hydrogen pressure of 1,000 to 1,500 psi generally suffices to obtain fast hydrogenation rates at temperatures comprised between 100 and 175° C. In many cases the hydrogen is readily absorbed at temperatures of 130°–140° C.

Once the absorption of hydrogen ceases, the reaction mixture is cooled below the boiling temperature of the lower aliphatic carboxylic acid formed.

The rhenium sulphide of use according to the present invention can be prepared by methods well known to those skilled in the art and described in literature. For instance rhenium(VII) sulphide can be prepared as described in Jl.Am.Chem.Soc. 76, 1519-23(1954).

The following preparations illustrate the method of the present invention.

Preparation 1: 2-methylbenzothiazole

In an autoclave 1 mole of bis(2-aminophenyl)disulphide was suspended into 4 moles of acetic anhydride whereupon 2.5 g of rhenium(VII) sulphide were added. The autoclave was charged with a hydrogen pressure of 1,500 psi and then slowly heated till hydrogen is readily absorbed (130°–140° C). When the uptake of hydrogen ceased the reaction mixture was cooled to about 110° C and the catalyst was filtered off. The catalyst remaining on the filter was washed with a little acetic acid whereupon the filtrate was concentrated by evaporation at normal atmospheric pressure and 150° C.

The 2-methyl-benzothiazole obtained was purified by vacuum distillation. Yield : 91 percent. Boiling point : 119° C/15 mm. Purity degree : 99.4 percent (determined by titration with perchloric acid in acetic anhydride).

Preparation 2 :
2-ethyl-5-methoxycarbonylbenzothiazole 2-ethyl-5-methoxycarbonyl-benzothiazole was prepared according to the procedure of preparation 1 with the difference that there was started from 1 mole of bis-(4-methoxycarbonyl-2-nitrophenyl) disulphide suspended into 12 moles of propionic anhydride. Yield : 73 percent. Boiling point : 130°–132° C/0.25 mm. Purity degree : 98 percent (determined by titration with perchloric acid in acetic anhydride).

Preparation 3 : 2-ethylbenzothiazole 2-ethylbenzothiazole was prepared following the procedure of preparation 2 using 12 moles of propionic anhydride. Yield : 80 percent. Boiling point : 124° C./15 mm - 250° C/760 mm. Purity degree : 98.7 percent.

Preparation 4-19:

The compounds listed in the following table were prepared according to the method of the invention and as illustrated by the above preparations.

TABLE

| Preparation [a] | Compound | Moles of anhydride used per mole of starting product | Boiling point | Melting point, ° C. | Yield, percent | Purity degree in percent [f] |
|---|---|---|---|---|---|---|
| 4 [b] | 2,5-dimethylbenzothiazole | 4 | 129–130° C./15 mm. | | 90 | 98 |
| 5 | 2-methyl-5-chlorobenzothiazole | 8 | 147–149° C./15 mm. | 68 | 80 | 99.4 |
| 6 | 2-methyl-5-trifluoromethylbenzothiazole | 8 | 116–118° C./15 mm. | 62 | 84.5 | 100 |
| 7 | 2-methyl-5-methylsulphonylbenzothiazole | 32 | | 141 | 73.5 | 99.1 |
| 8 | 2-methyl-5-difluoromethylsulphonylbenzothiazole | 10.5 | | 132 | 63 | 99.2 |
| 9 | 2-methyl-5-trifluoromethylsulphonylbenzothiazole | 10.5 | 138° C./1 mm. | 88 | 55.4 | 97.8 |
| 10 [c] | 2-methyl-5-hydroxymethylbenzothiazole | 12 | 160° C./3.5 mm. | | 36.2 | (g) |
| 11 | 2-methyl-5-methoxycarbonylbenzothiazole | 12 | 160–162° C./2 mm. | 97 | 84 | 99 |
| 12 [d] | 2-methyl-5-aminobenzothiazole | 20 | | [e] >250 | 80 | [h] 99 |
| 13 | 2-methylbenzoselenazole | 16 | 261–262° C. (126–130° C./11 mm.) | 34 | 60 | 100 |
| 14 | 2-methyl-5-methoxybenzoselenazole | 4 | 140–142° C./3.5 mm.; 109–111° C./0.9 mm. | | 78 | 100 |
| 15 | 2,5,6-trimethylbenzoselenazole | 4 | 140–142° C./5 mm. | 92 | 70 | 100 |
| 16 | 2-methyl-6-chlorobenzothiazole | 6 | | 85–86 | 70 | 98 |
| 17 | 2-methyl-6-methoxybenzothiazole | 4 | 170° C./20 mm. | | 78 | 97.5 |
| 18 | (structure: naphtho-fused benzothiazole with C—CH₃) | 12 | | | 81 | 60 | 98.2 |
| 19 | (structure: naphtho-fused benzothiazole with C—CH₃) | 12 | | 94 | 55 | 97 | a. prepared unless otherwise stated starting from the bis(2-nitrophenyl)disulphide (method of preparation 2) using acetic anhydride, b. prepared starting from the corresponding bis(2-aminophenyl) disulphide (method of preparation 1), c. after the hydrogenation and filtering off the rhenium(VII) sulphide, the reaction mixture is concentrated by evaporation and then treated with hydrochloric acid in order to saponify the ester formed, d. prepared starting from bis(2,4-dinitrophenyl) disulphide. The 5-acetamido-2-methyl-benzthiazole formed after reduction being converted into the 5-amino-2-methyl-benzthiazole dichlorohydrate by treatment with hydrochlorid acid.

e. melting point of the dihydrochloride.

f. determined, unless otherwise stated, by titration with perchloric acid in acetic anhydride, g. determined by NMR spectrum as compared with same product prepared according to another method and showing a correct microanalysis, h. determined by argentometric chlorine determination and $NH_2$- determination with sodium nitrite.

The 2,2'-dinitro aromatic disulphides used as starting materials in preparing the above compounds according to the method of the present invention can be prepared as described in Organic Synthesis, Col. Vol. I, p. 220 by reaction of sodium disulphide with the 2-nitro-aromatic chloride. In this way were prepared :

bis(2-nitrophenyl)disulphide (m.p. : 193°–195° C), bis(4-methyl-2-nitrophenyl) disulphide (m.p. : 173° C), bis(4-chloro-2-nitrophenyl)disulphide (m.p. : 218° C), bis(4-trifluoromethyl-2-nitrophenyl) disulphide (m.p. : 161° C), bis(4-methylsulphonyl-2-nitrophenyl)disulphide (m.p. : 253°–255° C), bis(4-difluoro-methylsulphonyl-2-nitrophenyl)disulphide (m.p. : 180° C), bis(4-trifluoromethylsulphonyl-2-nitrophenyl)disulphide (m.p. : 235°–237° C), bis(4-hydroxymethyl-2-nitrophenyl)disulphide (m.p. : 150° C), bis(4-methoxycarbonyl-2-nitrophenyl)disulphide (m.p. : 210° C), bis(2,4-dinitrophenyl)disulphide (m.p. : >270° C), bis(2-nitro-5-chlorophenyl)disulphide (m.p. : 171° C), bis(2-nitro-5-methoxyphenyl)disulphide (m.p. : 152° C), bis(2-nitro-1-naphthyl)disulphide (m.p. : 176° C), bis(1-nitro-2-naphthyl)disulphide (m.p. : 189° C).

The bis(2-nitrophenyl)diselenide (m.p. 209° C) used as starting material for the preparation of 2-methyl-benzoselenazole was prepared by treating o-nitrophenylselenocyanide with potassium hydroxide according to the method described in Ber., 46 (1923) 94. Bis(2-nitro-4,5-dimethylphenyl)diselenide (m.p. 240° C) and bis(2-nitro-4-methoxyphenyl)diselenide (m.p. : 173° C) were prepared in a similar way.

The bis(2-aminophenyl)disulphide used in preparation 1 was prepared as follows :

2.280 g of sodium sulphide-9-water were dissolved in 4.5 litre of water whereupon 160 g of sulphur was added and the mixture heated with stirring till a clear solution was obtained.

The solution was placed in a 10 litre reaction vessel and heated till refluxing whereupon heating was stopped and 788 g of o-nitro-chlorobenzene were dropwise added in such a way that refluxing continued. When all o-nitro-chlorobenzene was added the reaction mixture was heated again and refluxed for 3 hours (until no hydrogen sulphide escaped anymore).

The reaction mixture was left standing overnight at room-temperature and the oil-layer formed was isolated. The residue was cooled in ice-water to 10° C whereupon 170 g of 50 percent hydrogen peroxide were added dropwise in 2 hours. The precipitate formed was separated by filtration, washed with water and dried under reduced pressure at 50° C. Finally the product was recrystallized from 1.5 litre of p-xylene. Yield : 400 g (67.5 percent). Melting point : 93° C.

We claim:

1. Method for the preparation of 2-alkyl substituted thiazoles or selenazoles having a fused-on benzene or naphthalene ring and said 2-substituted alkyl group having from 1 to 5 carbon atoms comprising the catalytic hydrogenation under pressure of an aromatic disulphide or diselenide having the formula:

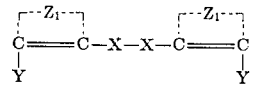

wherein:

X stands for sulphur or selenium,

Y stands for nitro or amino, and $Z_1$ stands for the atoms necessary to complete a benzene or naphthalene ring, wherein said hydrogenation takes place in the presence of an aliphatic carboxylic anhydride having the formula $(AlkCO)_2O$ Alk being $C_1$-$C_5$ alkyl, and rhenium(VII) sulphide catalyst.

2. Method according to claim 1 which includes the steps of admixing the said aromatic disulphide or diselenide with said aliphatic carboxylic anhydride and a catalystic amount of said rhenium sulphide, heating said mixture under a hydrogen pressure to a temperature at which hydrogen is readily absorbed until hydrogen absorption ceases, cooling the reaction mixture to a temperature below the boiling temperature of the aliphatic carboxylic acid formed and isolating the said 2-alkyl substituted thiazole or selenazole form the reaction mixture.

3. The method of claim 3 wherein said aliphatic carboxylic anhydride is acetic anhydride.

4. Method according to claim 1, wherein the catalyst is used in an amount comprised between 0.25 g and 10 g per mole of the said aromatic disulphide or diselenide.

5. Method according to claim 1, wherein the aliphatic carboxylic anhydride is used in an amount of at least 3 moles of anhydride per nitro group present in the said diselenide of disulphide and at least 2 moles of anhydride per amino group present in the said diselenide or disulphide.

6. The method of claim 5 wherein the aliphatic carboxylic anhydride is acetic anhydride.

7. Method according to claim 1, wherein hydrogenation takes place at a temperature in the range of from about 100°–175° C.

8. Method according to claim 1, wherein said aliphatic carboxylic anhydride is acetic anhydride or propionic anhydride.

9. The method of claim 1 wherein the aliphatic carboxylic anhydride is acetic anhydride.

* * * * *

UNITED STATES PATENT OFFICE
CERTIFICATE OF CORRECTION

Patent No. 3,759,935　　　　　　　　　Dated　September 18, 1973

Inventor(s)　Arthur Henri DE CAT ET AL

It is certified that error appears in the above-identified patent and that said Letters Patent are hereby corrected as shown below:

Column 1, line 32, "mononulcear" should read -- mononuclear --.
Column 2, lines 11-12, "disulphides" (second occurrence) should be deleted; Column 2, line 29, "rpduced" should read -- reduced --;
Column 2, line 39, "stated" should read -- started --. Column 3, line 63, "2.5 go f rhenium (VII) sulphide" should read -- 2.5 g of rhenium (VII) sulphide --. Column 6, line 30, claim 1, "(AlkCO)$_2$O Alk being" should read -- (AlkCO)$_2$O, Alk being --; Column 6, line 35, claim 2, "catalystic" should read -- catalytic --; Column 6, line 41, claim 2, "form" should read -- from --; Column 6, line 43, claim 3, "claim 3" should read -- claim 2 --; Column 6, line 52, claim 5, "diselenide of disulphide" should read -- diselenide or disulphide --.

Signed and sealed this 10th day of September 1974.

(SEAL)
Attest:

McCOY M. GIBSON, JR.　　　　　　　　　　C. MARSHALL DANN
Attesting Officer　　　　　　　　　　　　Commissioner of Patents